US012760157B2

(12) United States Patent
Shinohara et al.

(10) Patent No.: US 12,760,157 B2
(45) Date of Patent: Oct. 13, 2026

(54) PREPREG, LAMINATE, AND MOLDING

(71) Applicant: Toray Industries, Inc., Tokyo (JP)

(72) Inventors: Kyoko Shinohara, Iyo-gun (JP); Masato Honma, Iyo-gun (JP); Jun Misumi, Iyo-gun (JP)

(73) Assignee: Toray Industries, Inc., Tokyo (JP)

(*) Notice: Subject to any disclaimer, the term of this patent is extended or adjusted under 35 U.S.C. 154(b) by 996 days.

(21) Appl. No.: 17/611,693

(22) PCT Filed: May 15, 2020

(86) PCT No.: PCT/JP2020/019468
§ 371 (c)(1),
(2) Date: Nov. 16, 2021

(87) PCT Pub. No.: WO2020/235486
PCT Pub. Date: Nov. 26, 2020

(65) Prior Publication Data

US 2022/0315762 A1 Oct. 6, 2022

(30) Foreign Application Priority Data

May 23, 2019 (JP) ................................. 2019-097032

(51) Int. Cl.
*C08J 5/24* (2006.01)
*C08L 79/08* (2006.01)

(52) U.S. Cl.
CPC ............... *C08J 5/243* (2021.05); *C08L 79/08* (2013.01)

(58) Field of Classification Search
None
See application file for complete search history.

(56) References Cited

U.S. PATENT DOCUMENTS

| | | | | |
|---|---|---|---|---|
| 3,630,996 A * | 12/1971 | Tomalia | C08G 59/5046 528/407 |
| 8,415,007 B2 | 4/2013 | Honma et al. | |
| 9,676,936 B2 | 6/2017 | Shimizu et al. | |
| 9,676,937 B2 | 6/2017 | Kobayashi et al. | |
| 2009/0203279 A1* | 8/2009 | Mori | C08L 71/126 442/232 |
| 2012/0094106 A1* | 4/2012 | Honma | B29C 65/8215 428/299.1 |
| 2017/0158854 A1* | 6/2017 | Ueno | B32B 27/06 |
| 2019/0210301 A1 | 7/2019 | Naito et al. | |

FOREIGN PATENT DOCUMENTS

| | | | |
|---|---|---|---|
| CN | 104955883 | A | 9/2015 |
| CN | 106452373 | A | 3/2016 |
| CN | 109196026 | A | 1/2019 |
| EP | 2949689 | A1 | 12/2015 |
| JP | 04292635 | A | 10/1992 |
| JP | 05170952 | A | 7/1993 |
| JP | 05170953 | A | 7/1993 |
| JP | 0747152 | A | 2/1995 |
| JP | 10138354 | A | 5/1998 |
| JP | 2006044264 | A | 2/2006 |
| JP | 2006183173 | A | 7/2006 |
| JP | 2007016121 | A | 1/2007 |
| JP | 3906319 | B2 | 4/2007 |
| JP | 2008214547 | A | 8/2008 |
| JP | 2010189561 | A | 9/2010 |
| JP | 2010195337 | A | 9/2010 |
| JP | 2011099072 | A | 5/2011 |
| JP | 2015067910 | A | 4/2015 |
| JP | 2016183164 | A | 10/2015 |
| JP | 2018161801 | A | 10/2018 |
| WO | 2017083631 | A1 | 5/2017 |

OTHER PUBLICATIONS

Machine translation of JP,05-170952,A (Year: 1993).*
Del Saz-Orozco et al., "Toughening of carbon fibre/polybenzoxazine composites by incorporating polyethersulfone into the interlaminar region", Materials and Design, Dec. 23, 2015, vol. 93, pp. 297-303, XP029394837.
Xu et al., "Improving compression-after-impact performance of carbon-fiber composites by CNTs/thermoplastic hybrid film interlayer", Composites Science and Technology, Feb. 4, 2014, vol. 95, pp. 75-81, XP028836316.
Extended European Search Report for European Application No. 20809053.0, dated May 2, 2023, 10 pages.
International Search Report and Written Opinion for International Application No. PCT/JP2020/019468, dated Aug. 4, 2020, 7 pages.
Yamane et al., "Thermal diffusivity measurement of single fibers by an ac calorimetric method", J. Appl. Phys., 80 (1996), pp. 4358-4365.
Tiejun, Y. et al., Industrial Patents Analysis Report, Jun. 30, 2016, vol. 43, 5 pages with translation, Beijing Intellectual Property Press (Common Knowledge Document).

(Continued)

*Primary Examiner* — Robert T Butcher
(74) *Attorney, Agent, or Firm* — Buchanan Ingersoll & Rooney PC

(57) ABSTRACT

The present invention has an object of providing a prepreg for producing a laminate suitable as a structural material, and a laminate, which have excellent combustion resistance, compressive strength and interlaminar fractural toughness values, and can be firmly integrated with another structural member by welding. The present invention is a prepreg including structural components: [A] reinforcing fibers, [B] a thermosetting resin, and [C] a thermoplastic resin [C], wherein [B] includes at least one resin selected from a cyanate ester resin having an average cyanate equivalent of 220 or less, a bismaleimide resin having an average maleimide equivalent of 210 or less, and a benzoxazine resin having an average oxazine equivalent of 300 or less, [C] is present on a surface of the prepreg, and the reinforcing fibers [A] are present which are included in a resin area including [B] and a resin area including [C] across an interface between the two resin areas.

12 Claims, 2 Drawing Sheets

(56) References Cited

OTHER PUBLICATIONS

Campbell, F.C. et al., Manufacturing Processes for Advanced Composites, Dec. 31, 2016, 7 pages with translation, Shanghai Jiaotong University Press (Common Knowledge Document).
Harper, A. et al., Resin Transfer Molding Technology, Jan. 31, 2003, 4 pages with translation, Harbin University of Technology Press (Common Knowledge Document).
Fengxiang, Z. et al., Manual for Thermosetting Resin Matrix Composite Prepreg, Jun. 2019, 5 pages with translation, China Building Materials Industry Press (Common Knowledge Document).
Chinese Rejection Decision with English Search Report for Chinese Application No. 202080036816.3, dated Jun. 16, 2023, 12 pages.
Chinese Office Action with Search Report for Chinese Application No. 202080036816.3, dated Jan. 12, 2023, 11 pages.

* cited by examiner

PREPREG, LAMINATE, AND MOLDING

CROSS REFERENCE TO RELATED APPLICATIONS

This is the U.S. National Phase application of PCT/JP2020/019468, filed May 15, 2020 and claims priority to Japanese Patent Application No. 2019-097032, filed May 23, 2019, the disclosures of each of these applications being incorporated herein by reference in their entireties for all purposes.

FIELD OF THE INVENTION

The present invention relates to a prepreg in which reinforcing fibers are impregnated with a thermosetting resin and a thermoplastic resin, and a laminate or an integrated molding including a thermosetting resin, a thermoplastic resin, and reinforcing fibers.

BACKGROUND OF THE INVENTION

Fiber-reinforced composite materials in which a thermosetting resin or a thermoplastic resin is used as a matrix and is combined with reinforcing fibers such as carbon fibers or glass fibers are lightweight, and have excellent mechanical characteristics such as strength and rigidity, heat resistance, and corrosion resistance, and therefore have been applied to many fields such as aerospace, automobiles, railway vehicles, ships, civil engineering and construction, and sporting goods. These fiber-reinforced composite materials, however, are unsuitable for producing parts or structures having a complicated shape in a single molding process, and in the above applications, it is necessary to produce a member including a fiber-reinforced composite material and then to integrate the member with the same or different kind of member. Mechanical joining methods using bolts, rivets, or screws, and joining methods using an adhesive are used as a method for integrating the fiber-reinforced composite material including the reinforcing fibers and the thermosetting resin with the same or different kind of member. The mechanical joining method has disadvantages in which a production process is prolonged and a production cost is increased because a process in which a joint is previously processed, such as drilling, is necessary, and the strength of the material is deteriorated because of the drilling. The joining method using the adhesive has disadvantages in which the production process is prolonged because the method requires a bonding process including preparation of an adhesive and coating of the adhesive, and a curing process, and the sufficient reliability in bonding strength cannot be obtained.

To the fiber-reinforced composite material using the thermoplastic resin as the matrix can be applied a method for joining members by welding, in addition to the mechanical joining method and the joining method using the adhesive described above, and thus the time required for joining the members may possibly be shortened. On the other hand, when the mechanical characteristics at a high temperature and excellent chemical resistance are required as in structural members for aircrafts, there is a problem of insufficient heat resistance and chemical resistance as compared with the fiber-reinforced composite material including the thermosetting resin and the reinforcing fibers.

Here, Patent Document 1 shows a method for joining a fiber-reinforced composite material including a thermosetting resin and reinforcing fibers through an adhesive.

Patent Document 2 shows a method for integrating a member formed from a thermoplastic resin with a member formed from a fiber-reinforced composite material including a thermosetting resin. That is, a thermoplastic resin film is laminated on a surface of a prepreg sheet including the reinforcing fibers and the thermosetting resin, and heated and pressurized to obtain a fiber-reinforced composite material. Thereafter, the obtained fiber-reinforced composite material is put in a mold, a thermoplastic resin is injection-molded, and the thermoplastic resin member, formed by the injection molding, is joined to the fiber-reinforced composite material.

In addition, Patent Document 3 shows a method for producing a laminate in which a thermoplastic resin adhesive layer is formed on a surface of a composite material including a thermosetting resin and reinforcing fibers, and describes that the laminate exhibits an adhesion effect with another member through the thermoplastic resin.

Patent Document 4 discloses a prepreg in which a fiber formed from a thermoplastic resin is disposed on a surface layer of a prepreg formed from a reinforcing fiber and a thermosetting resin having high combustion resistance such as a maleimide resin or a cyanate ester resin, and a fiber-reinforced composite material thereof. It is shown that interlaminar fractural toughness values are increased while maintaining the high combustion resistance due to the presence of the fibers formed from this thermoplastic resin.

PATENT DOCUMENTS

Patent Document 1: Japanese Patent Laid-open Publication No. 2018-161801
Patent Document 2: Japanese Patent Laid-open Publication No. 10-138354
Patent Document 3: Japanese Patent No. 3906319
Patent Document 4: Japanese Patent Laid-Open Publication No. 4-292635

SUMMARY OF THE INVENTION

The method disclosed in Patent Document 1, however, is a method for joining the fiber-reinforced composite materials including the reinforcing fibers and the thermosetting resin to each other using the adhesive, and welding cannot be applied to the method for joining the fiber-reinforced composite materials as they are, because the thermosetting resin is used as a matrix resin. There is a problem of the joining process needing time because the curing of the adhesive needs time, and further, the joining strength exhibited is insufficient.

According to the method described in Patent Document 2, the joining strength is insufficient at the joint between the thermosetting resin and the thermoplastic resin film in the fiber-reinforced composite material.

The fiber-reinforced composite material according to Patent Document 3 can be integrated by welding through the thermoplastic resin, and exhibits excellent joining strength at room temperature, but has the insufficient joining strength at a high temperature.

According to the method described in Patent Document 4, the joining strength is insufficient at a boundary between the thermosetting resin and the thermoplastic resin in the fiber-reinforced composite material.

Therefore, an object of the present invention is to provide a prepreg, a laminate, and an integrated molding, which can be joined to the same or different kind of member by welding, exhibit excellent joining strength and fatigue joining strength in a high temperature environment, further exhibit excellent combustion resistance, compressive strength and interlaminar fractural toughness value, and provide a laminate suitable as a structural material.

That is, an exemplary embodiment of the present invention is a prepreg including the following structural components [A], [B], and [C], wherein [B] includes at least one resin selected from a cyanate ester resin having an average cyanate equivalent of 220 or less, a bismaleimide resin having an average maleimide equivalent of 210 or less, and a benzoxazine resin having an average oxazine equivalent of 300 or less, [C] is present on a surface of the prepreg, and the reinforcing fibers [A] are present which are included in a resin area including [B] and a resin area including [C] across an interface between the two resin areas:

[A] reinforcing fibers;

[B] a thermosetting resin; and

[C] a thermoplastic resin.

The present invention in an embodiment is also a laminate wherein a prepreg of the present invention forms at least a part of layers in the state of a cured product.

Further, the present invention in an embodiment is a laminate including a layer including the following structural components: [A] reinforcing fibers, [C] a thermoplastic resin, and [D] a cured product of a thermosetting resin, wherein [D] is a cured product of a thermosetting resin having a degree of cure of 90% or more, including at least one resin selected from a cyanate ester resin having an average cyanate equivalent of 220 or less, a bismaleimide resin having an average maleimide equivalent of 210 or less, and a benzoxazine resin having an average oxazine equivalent of 300 or less, and the reinforcing fibers [A] are present which are included in a resin area including [C] and a resin area including [D] across an interface between the two resin areas:

[A] reinforcing fibers;

[C] a thermoplastic resin; and

[D] a cured product of a thermosetting resin.

The present invention according to an exemplary embodiment is also a molding including a laminate according to the present invention, wherein the laminate is integrated with another member by joining the member to a surface of a structural component [C].

The prepreg and the laminate according to an embodiment of the present invention use the thermosetting resin and the thermoplastic resin and the resins are firmly joined to each other, and the prepreg can be well welded to the same or different kind of member, and thus, the time required for the joining process can be shortened and the molding speed of the structural members can be increased, as compared with conventional fiber-reinforced composite materials including a thermosetting resin and reinforcing fibers. Furthermore, by using the specific thermosetting resin, excellent combustion resistance, compressive strength and joining strength or interlaminar toughness are exhibited, and a laminate excellent as a structural material is obtained. When they are applied to aircraft structural members, wind turbine blades, automobile structural members, and computer applications such as IC trays and housings of notebook computers, it is possible to greatly reduce the molding time and molding cost of products in the applications described above, while exhibiting excellent performance as a structure.

DETAILED DESCRIPTION OF EMBODIMENTS OF THE INVENTION

Figure 1:
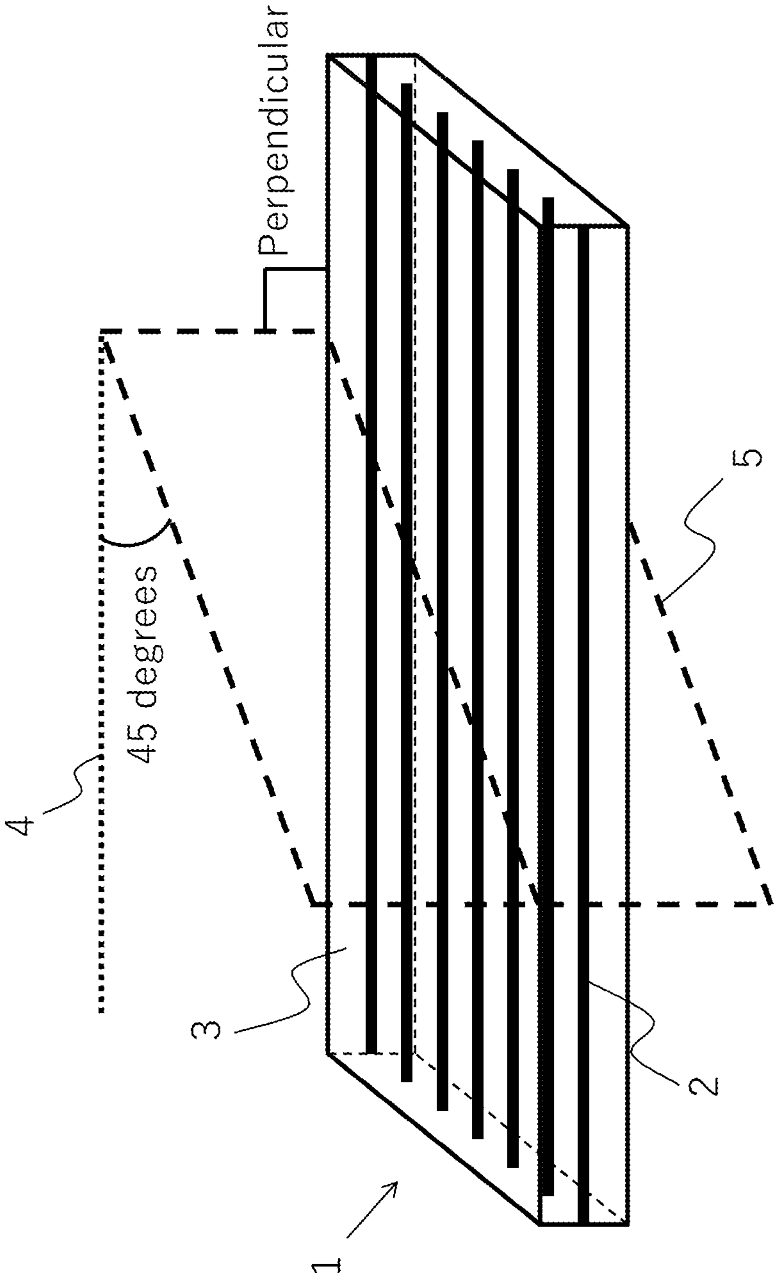
FIG. 1 is a schematic view showing a prepreg or a laminate according to an embodiment of the present invention, and showing a cross-section vertical to a prepreg plane or a laminate plane in FIG. 2.

The prepreg according to an embodiment of the present invention includes the following structural components [A], [B], and [C]:

[A] reinforcing fibers;

[B] a thermosetting resin; and

[C] a thermoplastic resin.

<Structural Component [A] Reinforcing Fibers>

The reinforcing fibers, the structural component [A], used in the present invention, may include glass fibers, carbon fibers, metal fibers, aromatic polyamide fibers, polyaramid fibers, alumina fibers, silicon carbide fibers, boron fibers, basalt fibers, and the like. They may be used alone or in combination of two or more, as appropriate. The reinforcing fibers may be subjected to a surface treatment. The surface treatment may include a metal deposition treatment, a treatment using a coupling agent, a treatment using a sizing agent, an additive deposition treatment, and the like. The reinforcing fibers may include reinforcing fibers having conductivity. As the reinforcing fibers, the carbon fibers are preferably used because of the low specific gravity, high strength, and high elastic modulus.

Commercially available products of the carbon fiber may include "TORAYCA (registered trademark)" T800G-24K, TORAYCA (registered trademark)" T800S-24K, "TORAYCA (registered trademark)" T700G-24K, "TORAYCA (registered trademark)" T700S-24K, "TORAYCA (registered trademark)" T300-3K, and "TORAYCA (registered trademark)" T1100G-24K (they are manufactured by Toray Industries, Inc.), and the like.

The form and arrangement of the reinforcing fibers can be appropriately selected from forms in which reinforcing fibers are arranged in one direction, laminates of a form in which reinforcing fibers are arranged in one direction, forms of a woven fabric, and the like. In order to obtain a laminate which is lightweight and has a higher level durability, it is preferable that, in each prepreg, the reinforcing fibers are in the form of continuous fibers such as long fibers (fiber bundles) arranged in one direction or woven fabrics.

The reinforcing fiber bundle may be composed of a plurality of fibers in the same form, or may be composed of a plurality of fibers in the different forms. The number of the reinforcing fibers forming one reinforcing fiber bundle is usually 300 to 60,000, and is preferably 300 to 48,000, more preferably 1,000 to 24,000 in consideration of production of a base material. The range may be a combination of any of the upper limits and any of the lower limits, described above.

The structural component [A], the reinforcing fibers, having a strand tensile strength, measured in accordance with the resin-impregnated strand test method of JIS R7608 (2007), of 5.5 GPa or more is preferable, because in such a case a laminate having the excellent joining strength in addition to the tensile strength can be obtained. The strand tensile strength is more preferably 5.8 GPa. The joining strength as used herein refers to a tensile shear joining strength determined in accordance with ISO 4587: 1995 (JIS K6850 (1994)).

In the reinforcing fibers, the structural component [A], the average surface roughness Ra is preferably 10 nm or less in terms of the combustion resistance, more preferably 2 nm or less. This is because when heat is applied to the laminate, if the average surface roughness Ra of the reinforcing fibers is 10 nm or less, combustion of the thermosetting resin is less likely to occur due to the small specific surface area of the reinforcing fibers, and the small area of the thermosetting resin with which the structural component [B] is contacted. The lower limit of the average surface roughness Ra of the structural component [A] is not particularly limited, and is 0.01 nm in normal reinforcing fibers.

It is also preferable that the reinforcing fibers, the structural component [A], have a thermal conductivity of 15 W/(mK) or less in terms of the combustion resistance. Further, the reinforcing fiber having the thermal conductivity is more preferably a carbon fiber. This is because the heat quantity transferred to the thermosetting resin, the structural component [B], is more suppressed as the thermal conductivity of the reinforcing fiber becomes lower when heat is applied to the laminate, and the combustion of the thermosetting resin is less likely to occur. The lower limit of the thermal conductivity of the structural component [A] is not particularly limited, but it is 0.1 W/(mK) in normal reinforcing fibers.

The prepreg of the present invention preferably has an amount of the reinforcing fibers per unit area of 30 to 2,000 $g/m^2$. When the amount of the reinforcing fibers is 30 $g/m^2$ or more, the number of layers can be reduced for obtaining a predetermined thickness in the molding of the laminate, and the operation tends to be simple. On the other hand, when the amount of the reinforcing fibers is 2,000 $g/m^2$ or less, the drapability of the prepreg is easily improved.

The mass content of the reinforcing fibers in the prepreg and the laminate of the present invention is preferably 30 to 90% by mass, more preferably 35 to 85% by mass, still more preferably 40 to 80% by mass. The range may be a combination of any of the upper limits and any of the lower limits, described above. When the mass content of the reinforcing fibers is 30% by mass or more, the amount of the resin is not excessively large relative to the amount of the fibers, and it is easy to obtain the advantage of the laminate having the excellent specific strength and specific elastic modulus, and a calorific value is hardly excessively increased at the time of curing during the molding from the prepreg to the laminate. When the mass content of the reinforcing fibers is 90% by mass or less, poor impregnation of the resin is unlikely to occur, and voids in the resulting laminate are likely to be reduced.

<Structural Component [B] Thermosetting Resin>

The structural component [B], the thermosetting resin, used in an embodiment of the present invention includes at least one resin selected from cyanate ester resins having an average cyanate equivalent of 220 or less, bismaleimide resins having an average maleimide equivalent of 210 or less, and benzoxazine resins having an average oxazine equivalent of 300 or less. Here, the average cyanate equivalent refers to a value obtained by dividing the average molecular weight of the cyanate ester resin by the average number of cyanate groups. Specifically, the chemical structure and the ratio thereof are identified by a liquid chromatography mass spectrometry (LC/MS method), and the average cyanate equivalent is calculated from the obtained average molecular weight of the cyanate ester resin and the average number of cyanate groups therein. Here, the average molecular weight in the present invention refers to a number average molecular weight.

Similarly to the average cyanate equivalent, the average maleimide equivalent and the average oxazine equivalent are values obtained by dividing the average molecular weight of the bismaleimide resin by the average number of maleimide groups, and values obtained by dividing the average molecular weight of the benzoxazine resin by the average number of benzoxazine rings, respectively. Specifically, the chemical structure and the ratio thereof are identified by liquid chromatography mass spectrometry, and the average maleimide equivalent or the average oxazine equivalent is calculated from the obtained average molecular weight of the bismaleimide resin and the average number of maleimide groups, or the average molecular weight of the benzoxazine resin and the average number of benzoxazine rings. Here, each of the average number of cyanate groups, the average number of maleimide groups, and the average number of benzoxazine rings in an embodiment of the present invention is obtained by averaging the functional groups or the rings by the number of molecules.

When the structural component [B] has an average cyanate equivalent of 220 or less, an average maleimide equivalent of 210 or less, or an average oxazine equivalent of 300 or less, the crosslink density thereof is high, so that the number of sites cleaved in the molecular chain increases during combustion. That is, the obtained laminate exhibits high resistance to combustion, because more energy is required for combustion. In addition, when each structural component [B] satisfies the requirement regarding the equivalent, the compressive strength of the laminate also increases. When the average cyanate equivalent of the structural component [B] is greater than 220, the average maleimide equivalent is greater than 210, or the average oxazine equivalent is greater than 300, the sufficient combustion resistance is not obtained, and the compressive strength is low. In general, when the average cyanate equivalent, the average maleimide equivalent, or the average oxazine equivalent of the structural component [B] is low, the resin toughness is improved, crack development is suppressed in the thermosetting resin, the structural component [B], and the fatigue joining strength is increased when the laminate is joined to a member to integrate them. In terms of the combustion resistance, the compressive strength, and the fatigue joining strength, it is more preferable that the structural component [B] includes at least one resin selected from cyanate ester resins having an average cyanate equivalent of 220 or less, bismaleimide resins having an average maleimide equivalent of 210 or less, and benzoxazine resins having an average oxazine equivalent of 300 or less, further more preferably at least one resin selected from cyanate ester resins having an average cyanate equivalent of 130 to 220, bismaleimide resins having an average maleimide equivalent of 120 to 210, and benzoxazine resins having an average oxazine equivalent of 210 to 300. On the other hand, when the average cyanate equivalent is less than 130, the average maleimide equivalent is less than 120, or the average oxazine equivalent is less than 210, the fatigue joining strength tends to be slightly decreased.

The cyanate ester resin used in the structural component [B] may include, for example, bisphenol A type cyanate ester resins, bisphenol F type cyanate ester resins, bisphenol P type cyanate ester resins, cyanate ester resins having a biphenyl backbone, cyanate ester resins having a naphthalene backbone, cyanate ester resins having a dicyclopentadiene backbone, phenol novolac type cyanate ester resins, cresol novolac type cyanate ester resins, phenol phenyl aralkyl type cyanate ester resins, phenol biphenyl aralkyl type cyanate ester resins, and naphthol phenyl aralkyl type cyanate ester resins, and the like. These cyanate ester resins may be used alone or in combination of two or more kinds thereof.

The bismaleimide resin used in the structural component [B] may include, but not limited to, for example, N,N'-phenylene bismaleimide, N,N'-hexamethylene bismaleimide, N,N'-methylene-di-p-phenylene bismaleimide, N,N'-oxy-di-p-phenylene bismaleimide, N,N'-4,4'-benzophenone bismaleimide, N,N'-diphenylsulfon bismaleimide, N,N'-(3,3'-dimethyl)-methylene-di-p-phenylene bismaleimide, N,N'-4,4'-dicyclohexylmethane bismaleimide, N,N'-m (or p)-xylylene-bismaleimide, N,N'-(3,3'-diethyl)-methylene-di-p-phenylene bismaleimide, N,N'-metatolylene-di-maleimide, bismaleimide of bis(aminophynoxy)benzene, reaction products of mixed polyamine, which is a reaction product of aniline and formalin, with maleic anhydride, and the like. These bismaleimide resins may be used alone or in combination of two or more thereof.

Examples of the benzoxazine resin used for the structural component [B] include bisphenol A type benzoxazine resins, bisphenol F type benzoxazine resins, thiodiphenol type benzoxazine resins, phenolphthalein type benzoxazine resins, benzoxazine resins having a biphenyl backbone, benzoxazine resins having a naphthalene backbone, benzoxazine resins having a dicyclopentadiene backbone, phenol novolac type benzoxazine resins and cresol novolac type benzoxazine resins, and the like. The benzoxazine resins may be used alone or in combination of two or more kinds thereof.

The composition including the structural component [B] may be combined with an epoxy resin, an amine compound, or the like, for property modification. The epoxy resin may include, for example, bisphenol type epoxy resins such as bisphenol A type epoxy resin, bisphenol F type epoxy resin, bisphenol AD type epoxy resin, and bisphenol S type epoxy resin, brominated epoxy resins such as tetrabromobisphenol A diglycidyl ether, epoxy resins having a biphenyl backbone, epoxy resins having a naphthalene backbone, epoxy resins having a dicyclopentadiene backbone, novolak type epoxy resins such as phenol novolak type epoxy resin and cresol novolak type epoxy resin, glycidyl amine type epoxy resins, resorcidyl glycidyl ether, and triglycidyl isocyanurate, and the like. The amine compound may include 3,3'-diisopropyl-4,4'-diaminodiphenylmethane, 3,3'-di-t-butyl-4,4'-diaminodiphenylmethane, 3,3',5,5'-tetraethyl-4,4'-diaminodiphenylmethane, 3,3'-diaminodiphenylmethane, 4,4'-diaminodiphenylmethane, 3,3'-diisopropyl-4,4'-diamino diphenyl ketone, 3,3'-di-t-butyl-4,4'-diamino diphenyl ketone, 3,3',5,5'-tetraethyl-4,4'-diamino diphenyl ketone, 4,4'-diamino diphenyl ketone, 3,3'-diamino diphenyl ketone, 3,3'-diisopropyl-4,4'-diaminodiphenyl sulfone, 3,3'-di-t-butyl-4,4'-diaminodiphenyl sulfone, 3,3',5,5'-tetraethyl-4,4'-diaminodiphenyl sulfone, 4,4'-diaminodiphenyl sulfone, 3,3'-diaminodiphenyl sulfone, m-phenylene diamine, m-xylylene diamine, diethyltoluene diamine, and the like.

<Structural Component [E] Thermoplastic Resin Component>

A resin area including the structural component [B] preferably includes a thermoplastic resin component soluble in the thermosetting resin, the structural component [B], in a dissolved state. Such a thermoplastic resin component is distinguished from the structural component [C] in that it is included in the resin area including the structural component [B]. When the structural component [E] is included, the affinity with the structural component [C], the thermoplastic resin, is improved, and the joining strength is also improved when the laminate is joined to a member through the structural component [C]. Here, "soluble in a thermosetting resin" refers to a state in which when a mixture of a thermoplastic resin component with a thermosetting resin is heated or stirred while heating, there is a temperature range in which the mixture is in a uniform phase. Here, "in a uniform phase" refers to a state in which separation is not observed visually. Here, the "dissolved state" refers to a state in which when the temperature of the thermosetting resin including the thermoplastic resin component is adjusted to a certain range, a uniform phase is formed. Once the uniform phase is formed in the certain temperature range, there is no problem even if the separation may occur at a temperature other than the temperature range, for example, at room temperature.

The thermoplastic resin of the structural component [E], is generally preferably a thermoplastic resin having a bond selected from the group consisting of a carbon-carbon bond, an amide bond, an imide bond, an ester bond, an ether bond, a carbonate bond, a urethane bond, a thioether bond, a sulfone bond, and a carbonyl bond in the main chain. In addition, the thermoplastic resin component may partially have a crosslinked structure, and may be crystalline or may be amorphous. In particular, it is preferably at least one resin selected from the group consisting of polyamide, polycarbonate, polyacetal, polyphenylene oxide, polyphenylene sulfide, polyarylate, polyester, polyamidoimide, polyimide, polyetherimide, polyimide having a phenyltrimethylindane structure, polysulfone, polyethersulfone, polyetherketone, polyetheretherketone, polyaramid, polyvinyl formal, polyvinyl butyral, phenoxy resin, polyethernitrile, and polybenzimidazole. In order to obtain the good heat resistance, it is preferable that the glass transition temperature is 150° C. or higher, more preferably 170° C. or higher from the point of view in which it is difficult to cause the thermal deformation when used as a molded body, and the polyetherimide and the polyethersulfone are preferable examples.

In terms of the improvement of joining strength, it is preferable that the structural component [E] is included in an amount of 3 parts by mass or more and 30 parts by mass or less based on 100 parts by mass of the structural component [B].

<Structural Component [C], Thermoplastic Resin>

The thermoplastic resin forming the structural component [C] is not particularly limited, and may include, for example, polyester-based resins such as polyethylene terephthalate, polybutylene terephthalate, polytrimethylene terephthalate, polyethylene naphthalate, and liquid crystal polyester, polyolefins such as polyethylene, polypropylene, and polybutylene, styrene-based resins, urethane resins, polyoxymethylene, polyamides such as polyamide 6 and polyamide 66, semi-aromatic polyamides, alicyclic polyamides, polycarbonate, polymethyl methacrylate, polyvinyl chloride, polyphenylene sulfide, polyphenylene ether, modified polyphenylene ether, polyimide, polyamide imide, polyetherimide, polysulfone, modified polysulfone, polyethersulfone, polyarylene ether ketone such as polyketone, polyarylene ether ketone, polyether ketone, polyether ether ketone, and polyether ketone ketone, polyarylate, polyether nitrile, phenol-based resins, phenoxy resins, and the like. In addition, the thermoplastic resins may be copolymers or modified products of the resin described above, and/or blended resins of two or more kinds thereof. Of these, it is preferable that one or more resins selected from the polyarylene ether ketone, the polyphenylene sulfide, and the polyetherimide are included in the thermoplastic resin, the structural component [C], in a content of 60% by weight or more, in terms of the heat resistance. In order to improve the impact resistance, an elastomer or a rubber component may be added thereto. Furthermore, other fillers and additives may be appropriately included depending on the use, and the like, as long as the object of the present invention is not impaired. They may include, for example, inorganic fillers, flame retardants, conductivity imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, coloring agents, pigments, dyes, foaming agents, antifoaming agents, coupling agents, and the like.

In the prepreg of the present invention, it is preferable that the structural component [C], the thermoplastic resin, has a basis weight of 10 g/m$^2$ or more. The basis weight is preferably 10 g/m$^2$ or more, because a sufficient thickness for exhibiting the excellent joining strength can be obtained. The basis weight is more preferably 20 g/m$^2$. The upper limit is not particularly limited, and is preferably 500 g/m$^2$ or less, because the amount of the thermoplastic resin is not excessively large as compared to the amount of the reinforcing fibers, and a laminate having the excellent specific strength and specific elastic modulus can be obtained. Here, the basis weight refers to a mass (g) of the structural component [C] included per m$^2$ of the prepreg. Specifically, it can be determined by sequentially immersing and extracting the prepreg in and from a solvent such as chloroform or methanol, and subjecting a soluble matter and an insoluble matter to an infrared spectroscopy (IR), a proton nuclear magnetic resonance spectroscopy ($^1$H NMR), a gel permeation chromatography (GPC) fractionation, or a gas chromatography mass spectrometry (GC/MS), whereby a chemical structure and a ratio of a molecule included in them are identified.

<Structural Component [D] Cured Product of Thermosetting Resin>

The structural component [D] is a cured product of a thermosetting resin having a degree of cure of 90% or more, the thermosetting resin including at least one resin selected from cyanate ester resins having an average cyanate equivalent of 220 or less, bismaleimide resins having an average maleimide equivalent of 210 or less, and benzoxazine resins having an average oxazine equivalent of 300 or less.

The cured product of thermosetting resin, the structural component [D], can be obtained by thermally curing the composition including the thermosetting resin, the structural component [B], under curing conditions capable of obtaining the degree of cure of 90% or more. Such curing conditions can be appropriately set according to the type of the thermosetting resin, and the type and amount of the curing agent and the accelerator; for example, when a cyanate ester resin or a bismaleimide resin is used as the thermosetting resin, curing conditions in which the curing is performed at 180° C. for 4 hours, followed by at 230° C. for 4 hours as a post-curing can be preferably used, and when a benzoxazine resin or an epoxy resin is used, curing conditions in which the curing is performed at 180° C. for 2 hours, followed by at 200° C. for 4 hours as post-curing can be preferably used.

The curing of the structural component [D] included in the laminate can be determined in a manner in which when the laminate is subjected to a differential scanning calorimetry at a temperature-rising rate of 10° C./min in an inert gas atmosphere, if an area of a peak appearing as an exothermic reaction (residual heat generation) is 50 J/g or less, it can be determined that the laminate is substantially a cured product. Alternatively, when the thermosetting resin composition before curing can be specified, the degree of cure is obtained by using the following formula, and if it is 90% or more, it may be determined that the resulting laminate is the cured product.

Degree of cure (%)=((a calorific value of the composition including the thermosetting resin before curing)−(a calorific value of the cured product of the thermosetting resin))/(a calorific value of the composition including the thermosetting resin before curing)×100.

In the formula described above, each calorific value is a value obtained by calculating as an area of a peak appearing as an exothermic reaction when a thermosetting resin composition including a thermosetting resin in the structural component [D] and a curing agent specified before curing, or a cured product of the thermosetting resin is subjected to a differential scanning calorimetry at a temperature-raising rate of 10° C./min in an inert gas atmosphere. Apart from the structural component [D] included in the laminate, resins having the same structure as those in the thermosetting resin and the resin specified as the curing agent are prepared, and they may be subjected to the measurement. Here, when the curing agent cannot be specified, 4,4'-diaminodiphenyl sulfone may be used as the curing agent in the composition. In addition, compounds described below in Examples such as a curing catalyst and a viscosity modifier can be preferably used as a component capable of forming the composition, and they are not particularly limited as long as they do not affect the measurement results.

<Prepreg>

In the prepreg according to an embodiment of the present invention, the reinforcing fibers [A] are present included in the resin area including [B] and the resin area including [C] across the interface between the two resin areas. The state in which it is included in the two resin areas across the interface between the two resin resins is explained with reference to FIG. 2. In the observation image 9 in FIG. 2, the resin area 7 including the structural component [C] closely adheres to the resin area 8 including the structural component [B], and is shown as an interface 10 in the observation image 9. In addition, a plurality of the structural components [A] 6 are present on the interface 10. The state in which the structural component [C] and the structural component [B] are brought into contact with each other around the reinforcing fibers, as described above, can be said as a state in which the reinforcing fibers are "included in the two resin areas across the interface". The presence of the reinforcing fibers [A] improves the strength of the resin area including the structural component [C], and improves the joining strength. The structural component [A] present on the interface is chemically and/or physically bonded to the structural component [B] and to the structural component [C], whereby the adhesive force between the resin area including the structural component [B] and the resin area including the structural component [C] is improved. It is enough that the number of the fibers in the structural component [A] present on the interface is 1 or more, and though the upper limit of the number is not particularly limited, it is 200 in an observation range described below.

For the prepreg according to an embodiment of the present invention, when the prepreg is viewed in planar view, it is possible to simultaneously evaluate an adhesive force in a fiber axis direction and a direction perpendicular to the fiber axis direction by observing an adhesion mode of the resin areas at the interface in a cross-section perpendicular to a plane of the prepreg including the fiber [A], from a direction at an angle different by 45 degrees, either clockwise or counterclockwise, to the direction of any fiber

[A] included in the two resin areas, that is, in a cross-section obtained by cutting the prepreg perpendicularly to the plane direction of the prepreg.

In the prepreg of the present invention, it is preferable that the cross-sectional curve, formed by the interface at which the two resin areas closely adhere to each other, has an average roughness length RSm, defined in JIS B0601 (2001), of 100 μm or less, and an average roughness height Rc of 3.5 μm or more.

In such a cross-sectional observation, when the cross-sectional curve, formed by the interface, has an average roughness length RSm, defined in accordance with JIS B0601 (2001), of 100 μm or less, it is less likely to be peeled off the resin area including the structural component [B] and the resin area including the structural component [C] from each other due to not only a chemical and/or physical bonding force but also a mechanical bonding force of interpenetration. The lower limit thereof is not particularly limited, and is preferably 15 μm or more for avoiding decrease in the mechanical bonding force due to stress concentration.

When the cross-sectional curve has an average roughness height Rc of 3.5 μm or more, not only the mechanical bonding force is exhibited by the interpenetration but also the structural component [A], present on the interface, is chemically and/or physically bonded to the structural component [B] and the structural component [C], whereby the adhesive force between the resin area including the structural component [B] and the resin area including the structural component [C] is improved. When Rc satisfies the range described above, it is easy to obtain the reinforcing fibers [A] included in the resin area including [B] and the resin area including [C] across the interface between the two resin areas.

The average roughness height Rc of the cross-sectional curve is preferably 10 μm or more, in which the structural component [A] is easily included in each resin area and thus the adhesive force is further improved, particularly preferably 20 μm or more. The upper limit is not particularly limited, and is preferably 100 μm or less for avoiding decrease in the mechanical bonding force due to stress concentration.

Here, known methods can be used for measuring the average roughness height Rc and the average roughness length RSm of the cross-sectional curve. Examples thereof may include a method in which after the structural component [B] is cured, measurement is performed from a cross-sectional image obtained using an X-ray CT, a method in which measurement is performed from an elemental analysis mapping image by using an energy dispersive X-ray spectrometer (EDS), and a method in which measurement is preformed from a cross-sectional observation image by using an optical microscope, a scanning electron microscope (SEM), or a transmission electron microscope (TEM). In the observation, the structural component [B] and/or the structural component [C] may be stained in order to adjust the contrasts. In the image obtained by any of the methods described above, the average roughness height Rc and the average roughness length RSm of the cross-sectional curve are measured in a range of 500 μm×500 μm.

Figure 2:
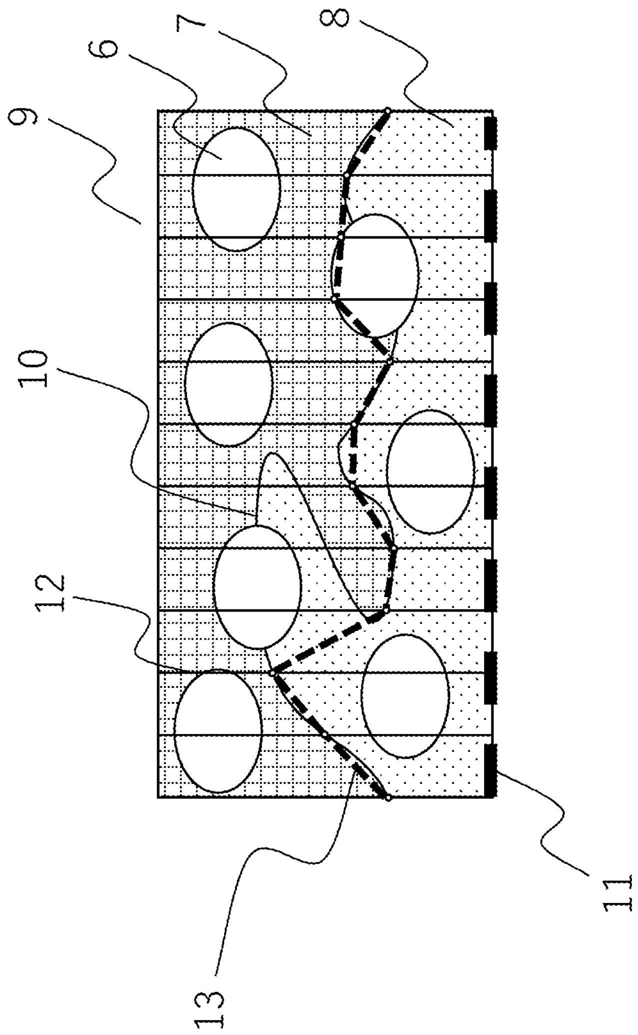
FIG. 2 is a schematic view showing a cross-section vertical to a prepreg plane or a laminate plane in an embodiment of the present invention, and helps explain a method for measuring an average roughness length RSm and an average roughness height Rc.

An example of a method for measuring the average roughness height Rc and the average roughness length RSm of the cross-sectional curve is shown with reference to FIG. 2. In the observation image 9 shown in FIG. 2, the resin area 7 including the structural component [C] closely adheres to the resin area 8 including the structural component [B], and is illustrated as the interface 10 in the observation image 9. In addition, a plurality of the structural components [A] 6 are present on the interface 10.

One example of the method for measuring the average roughness height Rc or the average roughness length RSm of the cross-sectional curve (a method 1 for measuring a cross-sectional curve element) is shown. Vertical baselines 12 are drawn at an interval of 5 μm from the resin area 8 including the structural component [B] toward the resin area 7 including the structural component [C], the end 11 on the resin area including the structural component [B] in the rectangular observation image 9 being defined as a baseline. Points at which the vertical baseline drawn from the baseline intersects the structural component [C] for the first time are plotted, and a line connecting the plotted points is defined as a cross-sectional curve 13. The obtained cross-sectional curve 13 is subjected to a filtering processing in accordance with JIS B0601 (2001), and the average roughness height Rc and the average roughness length RSm of the cross-sectional curve 13 are calculated.

In the prepreg of the present invention, it is preferable that the resin area including [B] and the resin area including [C] are adjacent to each other in a layered state to form the interface, because the excellent mechanical characteristics can be exhibited.

<Laminate>

<Laminate (Part 1)>

In the laminate (Part 1) according to an embodiment of the present invention, the prepreg of the present invention forms at least a part of the layers in the state of a cured product. It is preferable that there is the structural component [C], the thermoplastic resin, on the surface or between the layers. The presence of the structural component [C], thermoplastic resin, present on the surface of the laminate makes it possible to join the laminate according to an embodiment of the present invention to the same or different kind of member through the structural component [C] by welding. On the other hand, when there is a material including the structural component [C], the thermoplastic resin, between the layers of the laminate, an excellent interlaminar fractural toughness value ($G_{IIC}$) can be obtained. It is more preferable that there are the structural components [C] both on the surface and between the layers.

The laminate (Part 1) of the present invention can be produced by a method in which the prepregs of the present invention described above are laminated alone or together with other prepregs to form a product in which the prepreg of the invention forms at least a part of the layers, and the resulting product is cured by pressurization and heating. Here, as the method for applying heat and pressure, for example, a press molding method, an autoclave molding method, a bagging molding method, a wrapping tape method, an internal pressure molding method, or the like, is adopted.

<Laminate (Part 2)>

The laminate (Part 2) according to an embodiment of the present invention includes a layer including the following structural components [A], [C], and [D]:

[A] reinforcing fibers;

[C] a thermoplastic resin; and

[D] a cured product of a thermosetting resin.

In the laminate (Part 2) according to an embodiment of the present invention, the reinforcing fibers [A] are present which are included in the resin area including [C] and the resin area including [D] across the interface between the two resin areas. The detailed descriptions are the same as those in the prepreg according to embodiments of the present invention except that the structural component [B] is replaced with the structural component [D].

In the laminate (Part 2) according to an embodiment of the present invention, when the laminate is viewed in planar view, in a cross-section perpendicular to a plane of the laminate including the fiber [A], from a direction at an angle different by 45 degrees, either clockwise or counterclockwise, to the direction of any fiber [A] included in the two resin areas, that is, in a cross-section obtained by cutting the laminate perpendicularly to the plane direction of the laminate, the cross-sectional curve, formed by the interface at which the two resin areas closely adhere to each other, has an average roughness length RSm, defined by JIS B0601 (2001), of 100 μm or less, and an average roughness height Rc of 3.5 μm or more. The average roughness height Rc is preferably 10 μm or more. The detailed descriptions are the same as those in the prepreg of the present invention except that the structural component [B] is replaced with the structural component [D].

It is preferable in the laminate (Part 2) of the present invention that the resin area including [C] and the resin area including [D] are adjacent to each other in a layered state to form the interface, because the excellent mechanical characteristics can be exhibited.

In the laminate (Part 2) of the present invention, it is preferable that there is the structural component [C], the thermoplastic resin, on the surface thereof or between the layers. The presence of the structural component [C], thermoplastic resin, present on the surface of the laminate makes it possible to join the laminate of the present invention to the same or different kind of member through the structural component [C] by welding. On the other hand, when there is a material including the structural component [C], the thermoplastic resin, between the layers of the laminate, an excellent interlaminar fractural toughness value ($G_{IIC}$) can be obtained. It is more preferable that there are the structural components [C] both on the surface and between the layers.

The method for molding the laminate (Part 2) of the present invention may include, for example, molding methods such as a press molding method, an autoclave molding method, a bagging molding method, a wrapping tape method, an internal pressure molding method, a hand lay-up method, a filament winding method, a pultrusion method, a resin injection molding method, and a resin transfer molding method.

The laminate of the present invention can be evaluated for combustion resistance by a combustion test using a cone calorimeter in accordance with ISO 5660-1 (2002), and the total calorific value is preferably less than 6.0 MW/m$^2$ for 20 minutes, and more preferably 5.0 MW/m$^2$. The lower limit of the total calorific value in the 20 minute-combustion test using the cone calorimeter is not particularly limited, but is 0.01 MW/m$^2$ in a normal fiber-reinforced composite material.

<Molding>

The laminate of the present invention can be integrated (welded) with another member, i.e., a member (adherend), which is the same and/or different kind of member forming the laminate, through the structural component [C] present on the surface of the laminate, by joining the member to the structural component [C] by some kind of heating methods. The different kind of member (adherend) may include members including a thermoplastic resin and members including a metal material. The member including the thermoplastic resin may include reinforcing fibers, fillers, and the like. The integration method is not particularly limited, and may include, for example, thermal welding, vibration welding, ultrasonic welding, laser welding, resistance welding, induction welding, insert injection molding, outsert injection molding, and the like.

The strength of the joint in the integrated member can be evaluated based on ISO 4587 (1995). The tensile shear joining strength, measured based on ISO 4587 (1995), is preferably 13 MPa or more at a test environment temperature of 80° C., more preferably 16 MPa or more. This strength is higher than the tensile shear joining strength (about 10 MPa) of a general adhesive when the test environment temperature is 23° C. The better the molding, the higher the tensile shear joining strength, and the upper limit thereof is not particularly limited, and in integrated moldings of laminates generally used, the upper limit of the tensile shear joining strength is 200 MPa at a test environment temperature of 80° C.

Furthermore, the fatigue joining strength of the joint of the integrated joined member is preferably 11 MPa or more, more preferably 13 MPa or more when the test environment temperature is 23° C. Here, the fatigue joining strength refers to the maximum stress of a stress waveform that is broken at the $10^5$ time by performing a test in conditions of a distance between chucks of 100 mm, a sinusoidal stress waveform, a stress ratio R=0.1, and a frequency of 10 Hz, with reference to JASO M353 (1998), using a test piece prepared based on ISO 4587 (1995). The better the molding, the higher the fatigue joining strength, and the upper limit thereof is not particularly limited, and in integrated moldings of laminates generally used, the upper limit of the fatigue joining strength is 150 MPa at a test environment temperature of 23° C.

The laminate and the integrated molding of the present invention are preferably used in aircraft structural members, wind turbine blades, automobile external plates, computer applications such as IC trays and housings of laptop computers, and sports applications such as golf shafts and tennis rackets.

EXAMPLES

Hereinafter, the present invention will be described in more detail with reference to Examples. However, the scope of the present invention is not limited to these Examples. The unit "part" of the composition ratio refers to part by mass unless otherwise noted. In addition, measurements of various characteristics were performed under an environment in which a temperature was 23° C. and a relative humidity was 50% unless otherwise noted.

<Evaluation and Measurement Method>

(1) Strand Tensile Strength of Reinforcing Fiber

The strand tensile strength of the reinforcing fiber bundle was determined according to the following procedures in accordance with the resin-impregnated strand test method of JIS R7608 (2007). As a resin formulation, "CELLOXIDE" (registered trademark) 2021P (manufactured by Daicel Chemical Industries, Ltd.)/boron trifluoride monoethylamine (manufactured by Tokyo Chemical Industry Co., Ltd.)/acetone=100/3/4 (parts by mass) were used, and curing conditions of normal pressure, a temperature of 125° C., and a time of 30 minutes were used. 10 Resin-impregnated strands of the reinforcing fiber bundle were measured, and the average value thereof was defined as the strand tensile strength.

(2) Average Surface Roughness Ra of Reinforcing Fiber

A sample was obtained by placing 10 single fibers of carbon fiber to be evaluated on a sample stage and fixing the fibers to the sample stage with an epoxy resin, and an atomic force microscope (in Examples of the present invention, NanoScopeV Dimension Icon manufactured by Bruker AXS) was used. In addition, in Examples of the present invention, a three-dimensional surface shape image was obtained under the following conditions.

Probe: silicon cantilever (OMCL-AC160TSW2 manufactured by Olympus Corporation)

Measurement mode: tapping mode

Scanning speed: 1.0 Hz

Scanning range: 600 nm×600 nm

Resolution: 512 pixels×512 pixels

Measurement environment: at room temperature in the atmosphere.

For one single fiber, a three-dimensional surface shape image was measured under the conditions described above, and the obtained measurement image was subjected to a "flat processing" for removing waviness of data caused by the device, a "median 8 processing" which was a filter processing for replacing a central value of a matrix from a central value of Z data in a 3×3 matrix, and an image processing by a "three-dimensional inclination correction" in which a cubic curved surface was obtained from all image data by a least squares method, fitting was performed, and correction of an in-plane inclination was performed, using the attached software (NanoScope Analysis), in consideration of the curvature of the fiber cross-section; after that, the surface roughness was analyzed by the attached software, and the average surface roughness was calculated. Here, the average surface roughness (Ra) is a three-dimensional extension of the center line roughness Ra defined in JIS B0601 (2001) so as to be applicable to a measurement surface, and is defined as a value obtained by averaging absolute values of deviations from a reference surface to a designated surface.

10 Different monofilaments were randomly sampled, the measurement was performed 10 times in total one time for each monofilament, and the average value was obtained.

(3) Thermal Conductivity of Reinforcing Fiber

The thermal conductivity was calculated by using formula (1) from the following thermal diffusivity, density, and specific heat of the fiber bundle.

$$\lambda=\alpha\times\rho\times Cp \qquad (1)$$

λ: thermal conductivity (W/(mK))

α: thermal diffusivity ($m^2/s$)

Here, the thermal diffusivity was calculated according to a light alternating current method described in the following document.

T. Yamane, S. Katayama, M, Todoki and I. Hatta: J. Appl. Phys., 80 (1996) 4358.

ρ: density ($kg/m^3$)

The density was calculated by using the following formula (2) based on a weight W1 (kg) of an object to be measured in the air and a weight W2 (kg) in liquid having a density ρL when the object to be measured was immersed in the liquid.

$$\rho=W1\times\rho L/(W1-W2) \qquad (2)$$

Cp: specific heat (J/(kg·K))

The specific heat is a value measured at a measurement temperature of 25° C. by DSC (differential scanning calorimeter) with reference to JIS R1672(2006).

(4) Method for Measuring Melting Point of Thermoplastic Resin

The melting point of the thermoplastic resin was measured using a differential scanning calorimeter (DSC) in accordance with JIS K7121 (2012). When a plurality of melting points were observed in a mixture or the like, the highest melting point was adopted as the melting point of the thermoplastic resin.

(5) Combustion Test of Laminate by Cone Calorimeter

The prepregs [I] and [II], as described below, were cut into predetermined sizes to obtain 2 prepregs [I] and 3 prepregs [II]. The prepregs were laminated at [0°/90°/0°/90°/0° ] wherein an axial direction of the reinforcing fiber was defined as 0°, and a direction orthogonal to the axial direction was defined as 90°, to produce a preform. At that time, the lamination was performed so that the two outermost layers were the prepreg [I], and the thermoplastic resin layer including the structural component [C] was disposed on the surface layer of the preform. The preform was molded under the molding conditions described in Tables 2 and 3 to obtain a laminate. This laminate may also correspond to an embodiment of the laminate of the present invention or a comparative product thereof, but may also be said to be a laminate for evaluation of the combustion test.

The obtained laminate was cut into 100 mm square, and subjected to the combustion test using a cone calorimeter in accordance with ISO 5660-1 (2002). The heater radiation amount was 50 $MW/m^2$, and the heater temperature was 750° C. The test time was set to 20 minutes, the measurement was continued even after the flame disappeared, and the total calorific value was calculated. Evaluation was performed as described below based on the calculation result of the total calorific value.

Less than 5.0 $MW/m^2$: A 5.0 $MW/m^2$ or more and less than 6.0 $MW/m^2$: B 6.0 $MW/m^2$ or more and less than 7.0 $MW/m^2$: C 7.0 $MW/m^2$ or more: D (failed).

(6) Compressive Strength of Laminate

The prepregs [I] and [II], as described below, were cut into predetermined sizes to obtain 2 prepregs [I] and 4 prepregs [II]. The two outermost layers of both surfaces were the prepregs [I], the four prepregs [II] were put between them, and six, in total, layers were laminated so that all of the layers had the same reinforcing fiber direction, whereby a preform was produced. At that time, both surface layers of the preform were the thermoplastic resin layers including the structural component [C]. This preform was set in a press molding die, and the preform was heated under the conditions described in Tables 2 and 3 while maintaining this shape using a jig or a spacer as necessary, to obtain a laminate. This laminate may correspond to an embodiment of the laminate of the present invention or a comparative product thereof, but may also be said to be a laminate for evaluation of the compressive strength.

A tab was bonded to the obtained laminate in accordance with SACMA-SRM 1R-94, and then it was cut into a rectangular test piece having a length of 80 mm and a width of 15 mm, in which the reinforcing fiber axis direction was the length direction of the test piece. The obtained test piece was dried in a vacuum oven at 60° C. for 24 hours, the compressive strength was measured in a 23° C. environment using a universal material testing machine ("Instron" (registered trademark) model 5565 P8564 manufactured by Instron Japan Co., Ltd.) in accordance with SACMA-SRM 1R-94, and evaluation was performed as described below based on the measurement results.

1.6 GPa or more: A 1.4 GPa or more and less than 1.6 GPa: B 1.2 GPa or more and less than 1.4 GPa: C Less than 1.2 GPa: D (failed).

(7) Tensile Shear Joining Strength of Laminate

The prepregs [I] and [II], produced above, were cut into predetermined sizes to obtain 2 prepregs [I] and 6 prepregs [II]. The prepregs were laminated at $[0°/90°]_{2s}$ wherein an axial direction of the reinforcing fiber was defined as 0°, a direction orthogonal to the axial direction was defined as 90°, and the symbol s indicates mirror symmetry, to produce a preform. At that time, the lamination was performed so that the two outermost layers on both sides were the prepreg [I], and the thermoplastic resin layers including the structural component [C] were disposed on both surface layers of the preform. The preform was pressurized and heated under the molding conditions described in Tables 2 and 3 to obtain a laminate. This laminate may correspond to an embodiment of the laminate of the present invention or a comparative product thereof, but may also be said to be a laminate for evaluation of the tensile shear joining strength.

The obtained laminate was cut into 2 sheets, having sizes of a width of 250 mm and a length of 92.5 mm, in which the 0° direction is the length direction of the test piece, and dried in a vacuum oven for 24 hours. Thereafter, 2 cut panels having sizes of a width of 250 mm and a length of 92.5 mm, were overlaid on each other, with a width of 25 mm×a length of 12.5 mm in which the 0° direction was the length direction, a pressure of 3 MPa was applied thereto at a temperature 20° C. higher than the melting point of the thermoplastic resin, the structural component [C] used, and it was held for 1 minute to weld the overlaid surfaces, whereby an integrated molding was obtained. A tab was bonded to the obtained integrated molding in accordance with ISO 4587 (1995), and it was cut into a width of 25 mm to obtain a desired test piece.

The obtained test piece was dried in a vacuum oven for 24 hours, the tensile shear joining strength was measured at an environmental temperature of 80° C. based on ISO 4587 (1995), and evaluation was performed as described below based on the measurement results.

16 MPa or more: A

13 MPa or more and less than 16 MPa: B

10 MPa or more and less than 13 MPa: C

Less than 10 MPa: D (failed).

(8) Fatigue Joining Strength of Laminate

A test piece was prepared in the same procedure as in the above (7), and a test was performed by using a fatigue tester. With reference to JASO M353 (1998), a test was performed in conditions of a distance between chucks of 100 mm, a sinusoidal stress waveform, a stress ratio R=0.1, and a frequency of 10 Hz. The maximum stress of the stress waveform breaking at the $10^3$ time was defined as the fatigue joining strength. The evaluation was performed at a temperature of 23° C. The measurement results were evaluated as follows.

13 MPa or more: A

11 MPa or more and less than 13 MPa: B

9 MPa or more and less than 11 MPa: C.

(9) Method for Measuring Interlaminar Fractural Toughness Value $G_{IIC}$)

Prepregs [I], described below, were cut into a predetermined size, and 20, in total, prepregs [I] were laminated in the same reinforcing fiber direction. At that time, a release film for introducing preliminary cracks was put between the 10th sheet and the 11th sheet, which were placed at the center, to prepare a preform. The preform was pressurized and heated under the molding conditions described in Tables 2 and 3 to obtain a laminate. This laminate may correspond to an embodiment of the laminate of the present invention or a comparative product thereof, but may also be said to be a laminate for evaluation of the interlaminar fractural toughness value in that a release film for introduction of the preliminary cracks is put between the layers.

The obtained laminate was cut into a rectangular test piece having a length of 150 mm and a width of 20 mm, in which the reinforcing fiber axis was the length direction of the test piece, and dried in a vacuum oven at 60° C. for 24 hours. The obtained test piece was evaluated for interlaminar fractural toughness values ($G_{IIC}$) in an environment at 23° C. in accordance with JIS K7086 (1993).

(10) Measurement of Average Roughness Length RSm and Average Roughness Height Rc in Prepreg or Laminate Using a prepreg [I], described below, or a laminate, an image at a magnification of 1000 was photographed using an optical microscope in a cross-section, obtained by cutting it perpendicularly to a plane direction of the prepreg at an angle of 45 degrees in a planar view of the prepreg with respect to any fiber direction of [A] included in the two resin areas. In an arbitrary observation range of 500 μm×500 μm in the obtained image, the average roughness length RSm and the average roughness height Rc, defined in JIS B0601 (2001), of the cross-sectional curve element obtained by the measurement method 1 of the cross-sectional curve element, were measured.

<Materials Used in Examples and Comparative Examples>

(1) Structural Component [A]

Reinforcing fibers A-1 to A-4 of each specific example described in Tables 2 and 3 were produced with reference to Japanese Patent Laid-open Publication No. 2014-139360A.

A-1: Carbon fiber (strand tensile strength: 5.9 GPa, average surface roughness Ra: 5.0 nm, thermal conductivity: 30.5 W/(m·K))

A-2: Carbon fiber (strand tensile strength: 5.9 GPa, average surface roughness: Ra: 12.0 nm, thermal conductivity: 30.1 W/(m·K))

A-3: Carbon fiber (strand tensile strength: 5.9 GPa, average surface roughness: Ra: 1.3 nm, thermal conductivity: 30.8 W/(m·K))

A-4: Carbon fiber (strand tensile strength: 5.9 GPa, average surface roughness: Ra: 1.3 nm, thermal conductivity: 14.7 W/(m·K))

(2) A Thermosetting Resin Composition Including the Structural Component [B] in Each Specific Example Described in Tables 1 to 3 were Prepared Using the Following Compounds.

(2-1) Cyanate Ester Resin

Biphenyl type cyanate ester: Biphenol (manufactured by Tokyo Chemical Industry Co., Ltd.) and trimethylamine were dissolved in tetrahydrofuran, and the resulting solution was added dropwise to a mixed liquid of a methylene chloride solution including cyanogen chloride, and tetrahydrofuran. Thereafter, the reaction solution was concentrated, washed, and dried to obtain a biphenyl type cyanate ester (cyanate equivalent: 118).

Bisphenol A type cyanate ester resin ("CYTESTER" (registered trademark)) TA, manufactured by MITSUBISHI GAS CHEMICAL COMPANY, INC., cyanate equivalent: 139)

Bisphenol M type cyanate ester resin (AroCyXU366 (manufactured by Huntsman Advanced Materials LLC.), cyanate equivalent: 198)

1-Naphthol aralkyl type cyanate ester: an α-naphthol aralkyl resin (SN495V (manufactured by Nippon Steel Chemical Co., Ltd.)) and trimethylamine were dissolved in dichloromethane, and the resulting solution was added dropwise to a mixed liquid of a methylene chloride solution including cyanogen chloride, and dichloromethane. Thereafter, the reaction solution was concentrated, washed, and dried to obtain 1-naphthol aralkyl type cyanate ester (cyanate equivalent: 256).

(2-2) Bismaleimide Resin

N,N'-Ethylenebismaleimide (manufactured by Tokyo Chemical Industry Co., Ltd., maleimide equivalent: 110)

N,N'-Ethylenebismaleimide (manufactured by Tokyo Chemical Industry Co., Ltd., maleimide equivalent: 110)

N,N'-phenylene bismaleimide (BMI-3000 (manufactured by Daiwa Fine Chemicals Co., Ltd.), maleimide equivalent: 134)

Bisphenol F type bismaleimide (BMI-1000 (manufactured by Daiwa Fine Chemicals Co., Ltd.), maleimide equivalent: 179)

Bisphenol A diphenyl ether bismaleimide (BMI-4000 (manufactured by Daiwa Fine Chemicals Co., Ltd.), maleimide equivalent: 285).

(2-3) Benzoxazine Resin

Naphthalene type benzoxazine: 2,6-Hydroxynaphthalene (manufactured by Tokyo Chemical Industry Co., Ltd.), aniline, and formaldehyde were mixed and heated. Thereafter, the reaction solution was dissolved in chloroform, washed, and dried to obtain naphthalene type benzoxazine (oxazine equivalent: 193).

Bisphenol F type benzoxazine (BF-BXZ (manufactured by Konishi Chemical Ind., Ltd.), oxazine equivalent: 217)

Dicyclopentadiene type benzoxazine ("Araldite" (registered trademark) MT36000 (manufactured by Huntsman Advanced Materials LLC.), oxazine equivalent: 277)

Phenol novolac type benzoxazine: A biphenylphenol novolac resin (GPH-65 (manufactured by Nippon Kayaku Co., Ltd.)), aniline, and formaldehyde were mixed and heated. Thereafter, the reaction solution was dissolved in chloroform, washed and dried to obtain phenol novolak type benzoxazine (oxazine equivalent: 318).

(2-4) Epoxy Resin

Tetraglycidyl diaminodiphenylmethane ("Araldite" (registered trademark) MY721, manufactured by Huntsman Advanced Materials LLC.), epoxy equivalent: 113)

Bisphenol A type epoxy resin ("jER" (registered trademark) 825, manufactured by Mitsubishi Chemical Corporation), epoxy equivalent: 175).

(2-5) Amine Compound 4,4'-Diaminodiphenyl sulfone ("SEIKACURE" S, manufactured by Wakayama Seika Kogyo Co., Ltd.)

4,4'-Diaminodiphenylmethane (manufactured by Tokyo Chemical Industry Co., Ltd.).

(2-6) [E] Thermoplastic Resin Soluble in Thermosetting Resin

Polyethersulfone ("SUMIKA EXCEL" (registered trademark) PES5003P, manufactured by Sumitomo Chemical Co., Ltd.).

(2-7) Method for Preparing Thermosetting Resin Composition

CE-1 to 4, shown in Table 1, were prepared according to the following method. A cyanate ester resin, described in Table 1, and tetraphenylphosphonium tetra-p-tolylborate ("TPP-MK" (registered trademark) manufactured by Hokko Chemical Industry Co., Ltd.) were put into a kneading apparatus, and they were heated and kneaded at a temperature of 100° C. or lower to obtain a thermosetting resin composition. CE-5 was obtained in a manner in which a cyanate ester resin, described in Table 1, and polyethersulfone were put into a kneading apparatus, they were kneaded with heating, TPP-MK was added thereto at a temperature of 100° C. or lower, and the mixture was stirred to obtain a thermosetting resin composition.

BMI-1 to 4 was prepared according to the following method. A bismaleimide resin, described in Table 1, was put into a kneading apparatus, an amine compound, described in Table 1, and dialkyl peroxide ("PERCUMYL" (registered trademark) D, manufactured by NOF CORPORATION) were added thereto at a temperature of 100° C. or lower, and the mixture was stirred to obtain a thermosetting resin composition.

The BOX-1 to 4 were prepared according to the following method. A benzoxazine resin, described in Table 1, was put into a kneading apparatus, an epoxy resin, described in Table 1, and methyl toluenesulfonate (manufactured by Tokyo Chemical Industry Co., Ltd.) were added thereto at a temperature of 100° C. or lower, and the mixture was stirred to obtain a thermosetting resin composition.

EP, shown in Table 1, was prepared according to the following method. An epoxy resin, described in Table 1, and polyethersulfone were put into a kneading apparatus, and the mixture was kneaded with heating to dissolve the polyethersulfone. Then, the temperature was lowered to 100° C. or lower while continuing the kneading, and an amine compound, described in Table 1, was added thereto, and the mixture was stirred to obtain a thermosetting resin composition.

(3) Materials Used in Structural Component [C] and Evaluation Method

The following thermoplastic resins were used as the thermoplastic resins described in Tables 2 and 3.

PA6: Film including polyamide 6 ("Amilan" (registered trademark) CM 1007 (manufactured by Toray Industries, Inc., melting point: 225° C.) and having a basis weight of 120 g/m$^2$)

PPS: Film including polyphenylene sulfide ("Torelina" (registered trademark) A670T05 (manufactured by Toray Industries, Inc., melting point: 278° C. and having a basis weight of 120 g/m$^2$)

PP: Film including polypropylene ("UMEX" (registered trademark) 1010 (manufactured by Sanyo Chemical Industries, Ltd., melting point: 142° C. and having a basis weight of 120 g/m$^2$).

PEs: Film including polyester ("Hytrel" (registered trademark) 2551 (manufactured by DU PONT-TORAY CO., LTD., melting point: 164° C. and having a basis weight of 120 g/m$^2$).

PC: Film made of polycarbonate ("Iupilon" (registered trademark) (Manufactured by Mitsubishi Engineering-Plastics Corporation, softening point 230° C. and having a basis weight of 120 g/m$^2$).

PEKK: Film including polyether ketone ketone ("KEPSTAN" (registered trademark) 7002 (manufactured by Arkema Com., melting point: 337° C., and having a basis weight of 120 g/m$^2$).

PEEK: Film including polyether ether ketone (PEEK 450G (manufactured by Victrex, melting point: 343° C. and having a basis weight of 120 g/m$^2$).

<Method for Producing Prepreg>

The prepreg was prepared by the following 2 methods. The structural components used in each Example were as described in Tables 2 and 3.

Prepreg [I]

While the structural component [A], the reinforcing fibers (basis weight: 193 g/$m^2$), described in Tables 2 and 3, was drawn out as a reinforcing fiber sheet in a continuous state in which the fibers were arranged in one direction and the sheet was run in one direction, a resin sheet including the structural component [C] and having a basis weight of 120 g/$m^2$ was put on the continuous reinforcing fiber sheet, and the structural component [C] was melted by heating it with an IR heater to attach it to the entire one surface of the continuous reinforcing fiber sheet, and pressure was applied to the resulting sheet with nip rolls having a surface temperature maintained to be equal to or lower than the melting point of the structural component [C] to cool the reinforcing fiber sheet impregnated, whereby a fiber-reinforced resin intermediate was obtained. The thermosetting resin composition, the structural component [B], selected as described in Tables 2 and 3, was coated on a release paper in a resin basis weight of 100 g/$m^2$ using a knife coater to produce a thermosetting resin film, and then the thermosetting resin film was overlaid on a surface opposite to the surface impregnated with the structural component [C] in the intermediate, and the resulting film was heated and pressurized by using heat rolls to impregnate the intermediate with the thermosetting resin composition, whereby a prepreg [I] was obtained. This prepreg [I] may correspond to an embodiment of the prepreg of the present invention or a comparative product thereof.

Prepreg [II]

Prepreg [II], as a precursor of the laminate, was produced combining with the prepreg [I] as follows: The thermosetting resin composition, the structural component [B], selected as described in Tables 2 and 3, was coated on a release paper in a resin basis weight of 50 g/$m^2$ using a knife coater to produce a resin film. The resin film was overlaid on both sides of the reinforcing fibers (basis weight: 193 g/$m^2$), the structural component [A], arranged in one direction, and the resulting film was heated and pressurized by using heat rolls to impregnate the carbon fibers with the thermosetting resin, whereby a prepreg [II] was obtained.

Examples 1 to 3 and Comparative Example 1

In Examples 1 to 3, the cyanate ester resins having different average cyanate equivalents were used as the structural component [B], as shown in Table 2. The total calorific value obtained by the combustion test using the cone calorimeter was more decreased as the average cyanate equivalent became smaller, and a favorable tendency was shown in the combustion resistance. In addition, the higher the compressive strength, the smaller the average cyanate equivalent, and this was a preferable tendency. Furthermore, the fatigue joining strength was more decreased as the average cyanate equivalent became smaller, but excellent characteristics were shown in all cases. On the other hand, in Comparative Example 1 described in Table 4, the fatigue joining strength was improved as compared with Example 1, but the total calorific value, obtained by the combustion test using the cone calorimeter, was increased, and the compressive strength was decreased, that is, unfavorable results were shown.

Examples 4 to 6 and Comparative Example 2

In Examples 4 to 6, the bismaleimide resins having different average maleimide equivalents were used as the structural component [B], as shown in Table 2. The total calorific value obtained by the combustion test using the cone calorimeter was more decreased as the average maleimide equivalent became smaller, and a favorable tendency was shown in the combustion resistance. In addition, the higher the compressive strength, the smaller the average maleimide equivalent, and this was a preferable tendency. Furthermore, the lower the fatigue joining strength, the smaller the average maleimide equivalent, but excellent characteristics were shown in all cases. On the other hand, in Comparative Example 2 described in Table 4, the fatigue joining strength was improved as compared with Example 4, but the total calorific value obtained by the combustion test using the cone calorimeter was increased, and the compressive strength was decreased, that is, unfavorable results were shown.

Examples 7 to 9 and Comparative Example 3

In Example 7 to 9, the benzoxazine resins having different average oxazine equivalents were used as the structural component [B] as shown in Table 2. The total calorific value obtained by the combustion test using the cone calorimeter was more decreased as the average oxazine equivalent became smaller, and a favorable tendency was shown in combustion resistance. In addition, the higher the compressive strength, the smaller the average oxazine equivalent, and this was a preferable tendency. Furthermore, the lower the fatigue joining strength, the smaller the average oxazine equivalent, but excellent characteristics were shown in all cases. On the other hand, in Comparative Example 3, the fatigue joining strength was improved as compared with Example 7, but the total calorific value in the combustion test by the cone calorimeter was increased, and the compressive strength was decreased, that is, unfavorable results were shown.

Examples 10 and 11

As shown in Table 3, in Examples 10 and 11, the reinforcing fibers, the structural component [A], having an average surface roughness Ra different from that in Example 2 were used. As can be seen from comparison among Examples 2, 10, and 11, the total calorific value obtained by the combustion test using the cone calorimeter was more decreased as the average surface roughness Ra of the structural component [A] became smaller, and a favorable tendency was shown.

Example 11 and Example 12

As shown in Table 3, in Example 12, the reinforcing fibers, the structural component [A], having a thermal conductivity of different from that in Example 11 were used. As can be seen by comparing Examples 11 and 12, the total calorific value obtained by the combustion test using the cone calorimeter was more decreased as the thermal conductivity of the structural component [A] became smaller, and a favorable tendency was shown, and a preferable tendency was shown.

Example 13

As shown in Tables 1 and 3, in Example 13, the thermosetting resin composition including the thermoplastic resin soluble in the thermosetting resin was used as the structural component [B]. As a result, the tensile shear joining strength at 80° C. was increased as compared with Example 2, and excellent properties were exhibited.

Example 14

As shown in Table 3, in Example 14, when the polyphenylene sulfide was used as the structural component [C], then the tensile shear joining strength at 80° C. was increased as compared with Example 2, and preferable characteristics were exhibited. On the other hand, although the fatigue joining strength was decreased as compared with Example 2, the characteristics were sufficient as a structural material.

Example 15

As described in Table 3, in Example 15, when the polypropylene was used as the structural component [C], then the tensile shear joining strength at 80° C. was decreased as compared with Example 2, but the characteristics were sufficient as a structural material.

Example 16

As shown in Table 3, in Example 16, when the polyester was used as the structural component [C], then preferable properties, equivalent to those in Example 2, were exhibited in all the items.

Example 17

As shown in Table 3, in Example 17, the polycarbonate was used as the structural component [C]. The tensile shear joining strength at 80° C. was improved as compared with Example 2, and preferable characteristics were exhibited.

Examples 18 and 19

As shown in Table 3, in Examples 18 and 19, the polyether ketone ketone and the polyether ether ketone were used as the structural component [C]. The tensile shear joining strength at 80° C. was improved as compared with Example 2, and preferable characteristics were exhibited.

Comparative Example 4

As shown in Table 4, in Comparative Example 4, the epoxy resin was used as the structural component [B]. As compared with Examples 2, 5, and 8, the total calorific value obtained by the combustion test using the cone calorimeter was increased, and the unpreferable result was shown in the combustion resistance.

Comparative Example 5

Films of polyamide 6 (“AMILAN” (registered trademark) CM 1007 (manufactured by Toray Industries, Inc.) having a film basis weight of 50 g/m$^2$ were attached to both surfaces of a reinforcing fiber sheet in which the fibers were arranged in one direction in a flat shape, and it was heated and pressed at 250° C. to obtain a prepreg having a reinforcing carbon fiber basis weight of 193 g/m$^2$. The obtained prepreg was cut into a predetermined size, and 6 prepregs were laminated in each of $[0°/90°]_{2s}$, or in the same direction for evaluations of the tensile shear joining strength and the compressive strength, then a pressure of 3 MPa was applied to each resulting laminate using a pressing machine, and they were heated at 250° C. for 10 minutes to obtain laminates. For the obtained laminates, measurements of the tensile shear joining strength, the fatigue joining strength and the compressive strength, and the combustion using a cone calorimeter (Comparative Example 5) were performed by the methods described in Examples. As shown in Table 3, in Comparative Example 5 in which no thermosetting resin was included, the compressive strength, the tensile shear joining strength at 80° C., and the fatigue joining strength were lower than those in Example 2, and only insufficient characteristics were shown as the structural material.

Example 20 and Comparative Examples 6 and 7

In Example 20, the prepreg [I], including the structural components described in Table 3, was cut into a predetermined size, and 20, in total, prepregs were laminated so as to have the same reinforcing fiber direction, and a release film for introducing preliminary cracks was put between the 10th sheet and the 11th sheet, which were placed at the center, to produce a preform.

In Comparative Example 6, a prepreg [II] was cut into a predetermined size without using the structural component [C], and the lamination and the insertion of the release film were performed in the same manner as in Example 20 to obtain a preform.

In Comparative Example 7, polyamide particles (SP-500, manufactured by Toray Industries, Inc.) were uniformly dispersed on one surface of a prepreg [II], cut into a predetermined size, in an amount of the particles per unit area of the prepreg of 7 g/m$^2$, and then the lamination and the insertion of the release film were performed in the same manner as in Example 20 to obtain a preform.

These preforms were pressurized and heated by the procedures described above to obtain a laminate for evaluation of the interlaminar fractural toughness value. For the obtained laminate for the evaluation, the interlaminar fractural toughness value ($G_{IIC}$) was evaluated by the method described above. As shown in Tables 3 and 4, in Example 20 in which the structural component [C] was included in an inner layer part of the laminate, the excellent interlaminar fractural toughness value was shown as compared with Comparative Example 6 in which no structural component [C] was included and Comparative Example 7 in which the thermoplastic resin was included as a different form.

In the prepregs and the laminates of all Examples, it was confirmed that the reinforcing fibers [A] were included in the resin area including [B] and the resin area including [C] across the interface between the two resin areas, or included in the resin area including [C] and the resin area including [D] across the interface between the two resin areas. In Comparative Example 7, the reinforcing fibers [A] were not included in the resin area including [C].

TABLE 1

| | | | Equivalent | CE-1 | CE-2 | CE-3 | CE-4 | CE-5 |
|---|---|---|---|---|---|---|---|---|
| Thermosetting resin composition | Cyanate ester resin | Biphenyl type cyanate ester | 118 | 100 | — | — | — | — |
| | | Bisphenol A type cyanate ester (Cytester ®TA) | 139 | — | 100 | — | — | 100 |

TABLE 1-continued

| | | | | | | | | |
|---|---|---|---|---|---|---|---|---|
| | | Bisphenol M type cyanate ester (Arocy XU366) | 198 | — | — | 100 | — | — |
| | | 1-Naphthol aralkyl type cyanate ester | 256 | — | — | — | 100 | — |
| | Bismaleimide resin | N,N'-Ethylenebismaleimide | 110 | — | — | — | — | — |
| | | N,N'-phenylenebismaleimide (BMI-3000) | 134 | — | — | — | — | — |
| | | Bisphenol F type bismaleimide (BMI-1000) | 179 | — | — | — | — | — |
| | | Bisphenol A diphenyl ether bismaleimide (BMI-4000) | 285 | — | — | — | — | — |
| | Benzozazine resin | Naphthalene type benzoxazine | 193 | — | — | — | — | — |
| | | Bisphenol F type benzoxazine (BF-BXZ) | 217 | — | — | — | — | — |
| | | Dicyclopentadiene type benzoxazine (“Araldite ®” MT36000) | 277 | — | — | — | — | — |
| | | Phenol novolac type benzoxazine | 318 | — | — | — | — | — |
| | Epoxy resin | Tetraglycidyl diaminodiphenylmethane (“Araldite ®” MY721) | 112 | — | — | — | — | — |
| | | Bisphenol A type epoxy (“jER ®”825) | 175 | — | — | — | — | — |
| | Amine compound | 4,4'-diaminodiphenylmethane | — | — | — | — | — | — |
| | | 4,4'-diaminodiphenyl sulfone (SEIKACURES) | — | — | — | — | — | — |
| | Thermoplastic resin | Polyethersulfone (“SUMIKA EXCEL ®” PES5003P) | — | — | — | — | — | 5 |

| | | | Equivalent | BMI-1 | BMI-2 | BMI-3 | BMI-4 | BOX-1 |
|---|---|---|---|---|---|---|---|---|
| Thermosetting resin composition | Cyanate ester resin | Biphenyl type cyanate ester | 118 | — | — | — | — | — |
| | | Bisphenol A type cyanate ester (Cytester ®TA) | 139 | — | — | — | — | — |
| | | Bisphenol M type cyanate ester (Arocy XU366) | 198 | — | — | — | — | — |
| | | 1-Naphthol aralkyl type cyanate ester | 256 | — | — | — | — | — |
| | Bismaleimide resin | N,N'-Ethylenebismaleimide | 110 | 67 | — | — | — | — |
| | | N,N'-phenylenebismaleimide (BMI-3000) | 134 | — | 67 | — | — | — |
| | | Bisphenol F type bismaleimide (BMI-1000) | 179 | — | — | 67 | — | — |
| | | Bisphenol A diphenyl ether bismaleimide (BMI-4000) | 285 | — | — | — | 67 | — |
| | Benzozazine resin | Naphthalene type benzoxazine | 193 | — | — | — | — | 75 |
| | | Bisphenol F type benzoxazine (BF-BXZ) | 217 | — | — | — | — | — |
| | | Dicyclopentadiene type benzoxazine (“Araldite ®” MT36000) | 277 | — | — | — | — | — |
| | | Phenol novolac type benzoxazine | 318 | — | — | — | — | — |
| | Epoxy resin | Tetraglycidyl diaminodiphenylmethane (“Araldite ®” MY721) | 112 | — | — | — | — | — |
| | | Bisphenol A type epoxy (“jER ®”825) | 175 | — | — | — | — | 25 |
| | Amine compound | 4,4'-diaminodiphenylmethane | — | 33 | 33 | 33 | 33 | — |
| | | 4,4'-diaminodiphenyl sulfone (SEIKACURES) | — | — | — | — | — | — |
| | Thermoplastic resin | Polyethersulfone (“SUMIKA EXCEL ®” PES5003P) | — | — | — | — | — | — |

| | | | Equivalent | BOX-2 | BOX-3 | BOX-4 | EP |
|---|---|---|---|---|---|---|---|
| Thermosetting resin composition | Cyanate ester resin | Biphenyl type cyanate ester | 118 | — | — | — | — |
| | | Bisphenol A type cyanate ester (Cytester ®TA) | 139 | — | — | — | — |
| | | Bisphenol M type cyanate ester (Arocy XU366) | 198 | — | — | — | — |
| | | 1-Naphthol aralkyl type cyanate ester | 256 | — | — | — | — |
| | Bismaleimide resin | N,N'-Ethylenebismaleimide | 110 | — | — | — | — |
| | | N,N'-phenylenebismaleimide (BMI-3000) | 134 | — | — | — | — |
| | | Bisphenol F type bismaleimide (BMI-1000) | 179 | — | — | — | — |
| | | Bisphenol A diphenyl ether bismaleimide (BMI-4000) | 285 | — | — | — | — |
| | Benzozazine resin | Naphthalene type benzoxazine | 193 | — | — | — | — |
| | | Bisphenol F type benzoxazine (BF-BXZ) | 217 | 75 | — | — | — |
| | | Dicyclopentadiene type benzoxazine (“Araldite ®” MT36000) | 277 | — | 75 | — | — |
| | | Phenol novolac type benzoxazine | 318 | — | — | 75 | — |

TABLE 1-continued

| | | | | | | |
|---|---|---|---|---|---|---|
| Epoxy resin | Tetraglycidyl diaminodiphenylmethane (“Araldite®” MY721) | 112 | — | — | — | 50 |
| | Bisphenol A type epoxy (“jER®”825) | 175 | 25 | 25 | 25 | 50 |
| Amine compound | 4,4'-diaminodiphenylmethane | — | — | — | — | — |
| | 4,4'-diaminodiphenyl sulfone (SEIKACURES) | — | — | — | — | 45 |
| Thermoplastic resin | Polyethersulfone (“SUMIKA EXCEL®” PES5003P) | — | — | — | — | 8 |

TABLE 2-1

| | | Example 1 | Example 2 | Example 3 | Example 4 | Example 5 | Example 6 |
|---|---|---|---|---|---|---|---|
| Structural component [A] | Reinforcing fiber | A-1 | A-1 | A-1 | A-1 | A-1 | A-1 |
| Structural component [B] | Thermosetting resin | CE-1 | CE-2 | CE-3 | BMI-1 | BMI-2 | BMI-3 |
| Structural component [C] | Thermoplastic resin | PA6 | PA6 | PA6 | PA6 | PA6 | PA6 |
| Position of structural component [C] | | Surface | Surface | Surface | Surface | Surface | Surface |
| Structural component [A] properties | Average surface roughness Ra (nm) | 5.0 | 5.0 | 5.0 | 5.0 | 5.0 | 5.0 |
| | Thermal conductivity (W/(m · K)) | 30.5 | 30.5 | 30.5 | 30.5 | 30.5 | 30.5 |
| Structural component [B] properties | Average equivalent | 118 | 139 | 198 | 110 | 134 | 179 |
| Prepreg properties | Average roughness length RSm (μm) | 46 | 44 | 41 | 48 | 45 | 42 |
| | Average roughness height Rc (μm) | 18 | 21 | 23 | 17 | 20 | 21 |
| Molding conditions* | | | | (1) | | | |
| Dynamic characteristics of laminate | Total calorific value ($MW/m^2$) | A 4.5 | B 5.0 | C 6.4 | A 4.8 | B 5.3 | C 6.7 |
| | Compressive strength (23° C.) (GPa) | B 1.57 | B 1.53 | B 1.44 | A 1.61 | B 1.57 | B 1.50 |
| | Tensile shear joining strength (80° C.) (MPa) | A 16.5 | A 16.6 | A 16.7 | A 16.3 | A 16.4 | A 16.5 |
| | Fatigue joining strength (23° C.) (MPa) | C 10.9 | B 11.3 | B 11.9 | C 10.8 | B 11.3 | B 11.7 |
| | $G_{IIC}$ ($kJ/m^2$) | — | — | — | — | — | — |

| | | Example 7 | Example 8 | Example 9 |
|---|---|---|---|---|
| Structural component [A] | Reinforcing fiber | A-1 | A-1 | A-1 |
| Structural component [B] | Thermosetting resin | BOX-1 | BOX-2 | BOX-3 |
| Structural component [C] | Thermoplastic resin | PA6 | PA6 | PA6 |
| Position of structural component [C] | | Surface | Surface | Surface |
| Structural component [A] properties | Average surface roughness Ra (nm) | 5.0 | 5.0 | 5.0 |
| | Thermal conductivity (W/(m · K)) | 30.5 | 30.5 | 30.5 |
| Structural component [B] properties | Average equivalent | 193 | 217 | 277 |
| Prepreg properties | Average roughness length RSm (μm) | 44 | 52 | 50 |
| | Average roughness height Rc (μm) | 15 | 16 | 18 |
| Molding conditions* | | | (2) | |
| Dynamic characteristics of laminate | Total calorific value ($MW/m^2$) | B 5.4 | B 5.9 | C 6.9 |
| | Compressive strength (23° C.) (GPa) | A 1.60 | B 1.56 | B 1.48 |
| | Tensile shear joining strength (80° C.) (MPa) | A 16.2 | A 16.3 | A 16.4 |

TABLE 2-1-continued

| | | Example 1 | Example 2 | Example 3 | Example 4 | Example 5 | Example 6 |
|---|---|---|---|---|---|---|---|
| | Fatigue joining strength (23° C.) (MPa) | C<br>10.9 | | B<br>11.1 | | B<br>11.7 | |
| | $G_{IIC}$ (kJ/m$^2$) | — | | — | | — | |

*Molding conditions (1) Autoclave molding at 180° C. for 4 h, followed by at 230° C. for 4 h, 0.6 MPa)
(2) Autoclave molding at 180° C. for 2 h, followed by at 200° C. for 4 h, 0.6 MPa)

TABLE 3-1

| | | Example 10 | Example 11 | Example 12 | Example 13 | Example 14 | Example 15 |
|---|---|---|---|---|---|---|---|
| Structural component [A] | Reinforcing fiber | A-2 | A-3 | A-4 | A-1 | A-1 | A-1 |
| Structural component [B] | Thermosetting resin | CE-2 | CE-2 | CE-2 | CE-5 | CE-2 | CE-2 |
| Structural component [C] | Thermoplastic resin | PA6 | PA6 | PA6 | PA6 | PPS | PP |
| Position of structural component [C] | | Surface | Surface | Surface | Surface | Surface | Surface |
| Structural component [A] properties | Average surface roughness Ra (nm) | 12.0 | 1.3 | 1.3 | 5.0 | 5.0 | 5.0 |
| | Thermal conductivity (W/(m · K)) | 30.1 | 30.8 | 14.7 | 30.5 | 30.5 | 30.5 |
| Structural component [B] properties | Average equivalent | 139 | 139 | 139 | 139 | 139 | 139 |
| Prepreg properties | Average roughness length RSm (μm) | 60 | 42 | 39 | 51 | 52 | 41 |
| | Average roughness height Rc (μm) | 22 | 21 | 21 | 22 | 23 | 16 |
| Molding conditions* | | | | | (1) | | |
| Dynamic characteristics of laminate | Total calorific value (MW/m$^2$) | B<br>5.3 | A<br>4.7 | A<br>4.3 | B<br>5.1 | B<br>5.0 | B<br>5.6 |
| | Compressive strength (23° C.) (GPa) | B<br>1.53 | B<br>1.53 | B<br>1.53 | B<br>1.53 | B<br>1.56 | B<br>1.54 |
| | Tensile shear joining strength (80° C.) (MPa) | A<br>17.0 | A<br>16.1 | A<br>16.0 | A<br>16.9 | A<br>19.1 | B<br>13.2 |
| | Fatigue joining strength (23° C.) (MPa) | B<br>11.3 | B<br>11.4 | B<br>11.4 | B<br>11.3 | C<br>10.3 | B<br>11.5 |
| | $G_{IIC}$ (kJ/m$^2$) | — | — | — | — | — | — |

| | | Example 16 | Example 17 | Example 18 | Example 19 | Example 20 |
|---|---|---|---|---|---|---|
| Structural component [A] | Reinforcing fiber | A-1 | A-1 | A-1 | A-1 | A-1 |
| Structural component [B] | Thermosetting resin | CE-2 | CE-2 | CE-2 | CE-2 | CE-2 |
| Structural component [C] | Thermoplastic resin | PEs | PC | PEKK | PEEK | PA6 |
| Position of structural component [C] | | Surface | Surface | Surface | Surface | Inner layer |
| Structural component [A] properties | Average surface roughness Ra (nm) | 5.0 | 5.0 | 5.0 | 5.0 | 5.0 |
| | Thermal conductivity (W/(m · K)) | 30.5 | 30.5 | 30.5 | 30.5 | 30.5 |
| Structural component [B] properties | Average equivalent | 139 | 139 | 139 | 139 | 139 |
| Prepreg properties | Average roughness length RSm (μm) | 42 | 45 | 47 | 49 | 45 |
| | Average roughness height Rc (μm) | 18 | 21 | 23 | 22 | 20 |
| Molding conditions* | | | | | (1) | |
| Dynamic characteristics of laminate | Total calorific value (MW/m$^2$) | B<br>5.5 | B<br>5.2 | A<br>4.7 | A<br>4.6 | B<br>5.0 |
| | Compressive strength (23° C.) (GPa) | B<br>1.55 | B<br>1.51 | B<br>1.58 | B<br>1.57 | |
| | Tensile shear joining strength (80° C.) (MPa) | A<br>16.1 | A<br>18.5 | A<br>24.1 | A<br>24.3 | |

TABLE 3-1-continued

| | | | | | | |
|---|---|---|---|---|---|---|
| | Fatigue joining strength (23° C.) (MPa) | B 12.0 | B 12.5 | B 11.9 | B 12.1 | |
| | $G_{IIC}$ (kJ/m$^2$) | — | — | — | — | 3.8 |

*Molding conditions (1) Autoclave molding (at 180° C. for 4 h, followed by at 230° C. for 4 h, 0.6 MPa)

TABLE 4-1

| | | Comparative Example 1 | Comparative Example 2 | Comparative Example 3 | Comparative Example 4 |
|---|---|---|---|---|---|
| Structural component [A] | Reinforcing fiber | A-1 | A-1 | A-1 | A-1 |
| Structural component [B] | Thermosetting resin | CE-4 | BMI-4 | BOX-4 | EP |
| Structural component [C] | Thermoplastic resin | PA6 | PA6 | PA6 | PA6 |
| Position of structural component [C] | | Surface | Surface | Surface | Surface |
| Structural component [A] properties | Average surface roughness Ra (nm) | 5.0 | 5.0 | 5.0 | 5.0 |
| | Thermal conductivity (W/(m · K)) | 30.5 | 30.5 | 30.5 | 30.5 |
| Structural component [B] properties | Average equivalent | 256 | 285 | 318 | — |
| Prepreg properties | Average roughness length RSm (μm) | 48 | 51 | 55 | 51 |
| | Average roughness height Rc (μm) | 22 | 21 | 21 | 20 |
| Molding conditions* | | (1) | | (2) | (3) |
| Dynamic characteristics of laminate | Total calorific value (MW/m$^2$) | D 7.0 | D 7.2 | D 7.8 | D 8.6 |
| | Compressive strength (23° C.) (GPa) | C 1.35 | C 1.38 | C 1.39 | B 1.54 |
| | Tensile shear joining strength (80° C.) (MPa) | A 16.7 | A 16.5 | A 16.4 | A 16.4 |
| | Fatigue joining strength (23° C.) (MPa) | B 12.5 | B 12.7 | B 12.1 | B 12.4 |
| | $G_{IIC}$ (kJ/m$^2$) | — | — | — | — |

| | | Comparative Example 5 | Comparative Example 6 | Comparative Example 7 |
|---|---|---|---|---|
| Structural component [A] | Reinforcing fiber | A-1 | A-1 | A-1 |
| Structural component [B] | Thermosetting resin | — | CE-2 | CE-2 |
| Structural component [C] | Thermoplastic resin | PA6 | — | PA particles |
| Position of structural component [C] | | Surface | Inner layer | Inner layer |
| Structural component [A] properties | Average surface roughness Ra (nm) | 5.0 | 5.0 | 5.0 |
| | Thermal conductivity (W/(m · K)) | 30.5 | 30.5 | 30.5 |
| Structural component [B] properties | Average equivalent | — | 139 | 139 |
| Prepreg properties | Average roughness length RSm (μm) | — | — | — |
| | Average roughness height Rc (μm) | — | — | — |
| Molding conditions* | | (4) | | (1) |
| Dynamic characteristics of laminate | Total calorific value (MW/m$^2$) | B 5.1 | B 5.0 | B 5.1 |
| | Compressive strength (23° C.) (GPa) | D 0.98 | | |
| | Tensile shear joining strength (80° C.) (MPa) | D 9.5 | | |

TABLE 4-1-continued

| | Comparative Example 1 | Comparative Example 2 | Comparative Example 3 | Comparative Example 4 |
|---|---|---|---|---|
| Fatigue joining strength (23° C.) (MPa) | C 10.4 | | | |
| $G_{IIC}$ (kJ/m$^2$) | — | 0.8 | | 2.4 |

*Molding conditions (1) Autoclave molding (at 180° C. for 4 h, followed by at 230° C. for 4 h, 0.6 MPa)
(2) Autoclave molding (at 180° C. for 2 h, followed by at 200° C. for 4 h, 0.6 MPa)
(3) Autoclave molding (at 180° C. for 2 hours, 0.6 MPa)
(4) Press molding (250° C. 10 min, 3.0 MPa)

DESCRIPTION OF REFERENCE SIGNS

1: Prepreg or laminate
2: Structural component [A]
3: Structural component [C] and structural component [B] or structural component [D]
4: Axial direction of any fiber bundle
5: Cross-section to be observed
6: Structural component [A]
7: Resin area including structural component [C]
8: Resin area including structural component [B] or structural component [D]
9: Observation image
10: Interface
11: Baseline
12: Vertical baseline
13: Cross-sectional curve

The invention claimed is:

1. A prepreg comprising the following structural components [A], [B], and [C], wherein

[A] is reinforcing fibers present in an amount of 30-90 wt %;

[B] is a thermosetting resin that includes at least one resin selected from a cyanate ester resin having an average cyanate equivalent of 130 to 220, a bismaleimide resin having an average maleimide equivalent of 120 to 210, and a benzoxazine resin having an average oxazine equivalent of 210 to 300; and

[C] is a thermoplastic polyarylene ether ketone resin present on the surface of the prepreg in an amount of 10-500 g/m$^2$, wherein the reinforcing fibers [A] are present in a resin area including [B] and a resin area including [C] across an interface between the two resin areas, wherein both [B] and [C] are in contact with the reinforcing fibers [A], and wherein the resin area including the reinforcing fibers [A] and the resin area including the thermoplastic resin [C] are adjacent to each other in a layered state to form the interface.

2. The prepreg according to claim 1, wherein, in a planar view of the prepreg, when a cross-section perpendicular to a plane of the prepreg including the [A] is obtained from a direction of an angle different by 45 degrees to a direction of any fiber [A] included in the two resin areas, a cross-sectional curve, formed by the interface between the two resin areas closely adhering to each other, in the cross-section, has an average roughness length RSm, defined in accordance with JIS B0601 (2001), of 100 μm or less, and an average roughness height Rc of 3.5 μm or more.

3. The prepreg according to claim 1, wherein the structural component [A] has an average surface roughness Ra of 10 nm or less.

4. The prepreg according to claim 1, wherein the structural component [A] is a carbon fiber having a thermal conductivity of 15 W/(m·K) or less.

5. The prepreg according to claim 1, wherein the structural component [B] includes a thermoplastic resin component soluble in a thermosetting resin in a dissolved state.

6. The prepreg according to claim 2, wherein the average roughness height Rc is 10 μm or more.

7. A laminate wherein a prepreg according to claim 1 forms at least a part of layers in the state of a cured product.

8. The laminate according to claim 7, wherein the structural component [C] is present on the surface.

9. The laminate according to claim 7, wherein a material including the structural component [C] is present between layers.

10. A molding comprising a laminate according to claim 7, wherein the laminate is integrated with another member by joining the member to a surface of a structural component [C].

11. The prepreg according to claim 1, wherein the polyarylene ether ketone is PEEK or PEKK.

12. The prepreg according to claim 1, wherein [C] is the only resin present in the resin area including [C].

* * * * *